(12) United States Patent  
Charrat

(10) Patent No.: US 6,587,518 B2
(45) Date of Patent: Jul. 1, 2003

(54) SYNCHRONOUS BPSK DECODER

(75) Inventor: Bruno Charrat, Aix en Provence (FR)

(73) Assignee: Inside Technologies, Saint Clement les Places (FR)

( * ) Notice: Subject to any disclaimer, the term of this patent is extended or adjusted under 35 U.S.C. 154(b) by 0 days.

(21) Appl. No.: 09/961,716

(22) Filed: Sep. 24, 2001

(65) Prior Publication Data

US 2002/0075973 A1 Jun. 20, 2002

Related U.S. Application Data

(63) Continuation of application No. PCT/FR00/00711, filed on Mar. 22, 2000.

(30) Foreign Application Priority Data

Mar. 25, 1999 (FR) .............................. 99 04109

(51) Int. Cl.$^7$ .............................. H03D 1/00; H04B 1/38
(52) U.S. Cl. .............................. 375/340; 375/220
(58) Field of Search .............................. 375/340, 219, 375/220, 298, 324; 370/516, 517, 335, 342

(56) References Cited

U.S. PATENT DOCUMENTS 5,640,427 A 6/1997 Rainish ..................... 375/329
6,219,356 B1 * 4/2001 Beukema ..................... 370/516

FOREIGN PATENT DOCUMENTS

DE 3424623 1/1985
EP 0 045 260 2/1982

* cited by examiner

Primary Examiner—Chi Pham
Assistant Examiner—Khai Tran
(74) Attorney, Agent, or Firm—Patterson, Thuente, Skaar & Christensen, LLC

(57) ABSTRACT

A method for decoding a pulsed signal coded by phase jumps, in which each bit is coded by N pulses of the coded signal and a change of the value of a bit in relation to the previous bit is coded by an inversion of the coded signal phase. The method has steps of sampling the coded signal by a pulsed strobe of the same frequency as the coded signal, with a sampling window the duration of which is less than the duration of one pulse of the coded signal. For each group of N pulses of the coded signal, the number of sampled pulses resulting from the sampling of the coded signal is counted, and then the value of the bit coded by the group of N pulses is deduced from it.

14 Claims, 3 Drawing Sheets

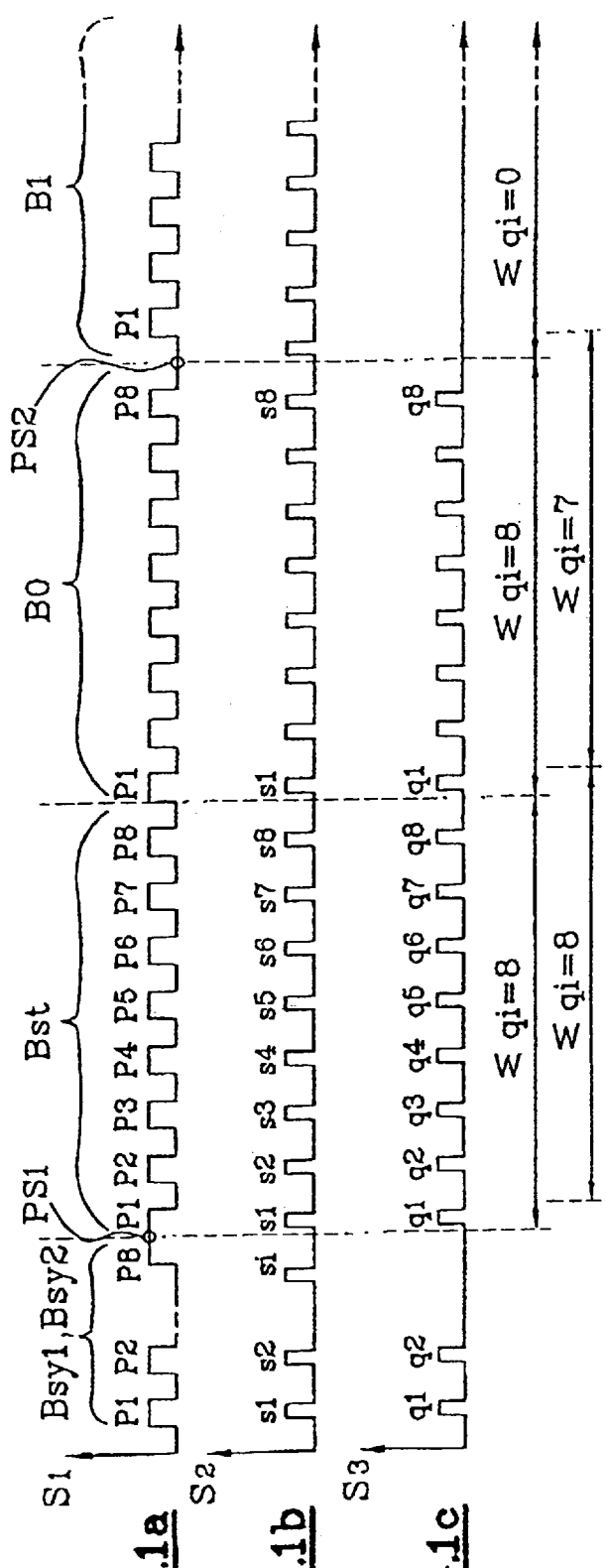
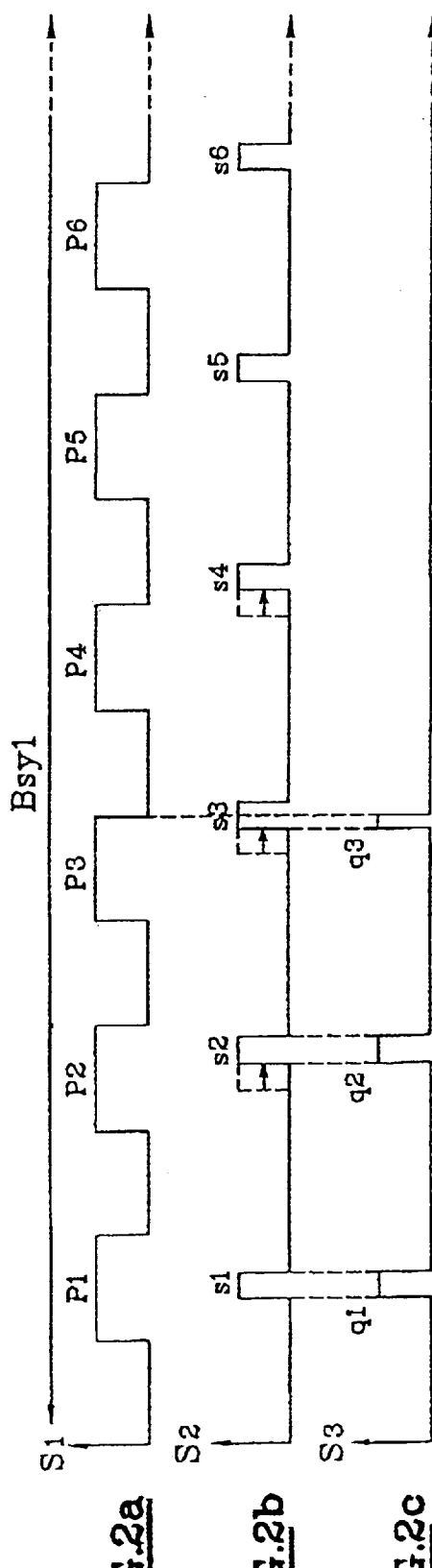

SYNCHRONOUS BPSK DECODER

This application is a continuation of PCT/FR00/00711, filed Mar. 22, 2000.

BACKGROUND OF THE INVENTION

1. Field of the Invention

The present invention relates to a method and a device for decoding a BPSK ("Binary Phase Shift Keying") coded pulsed signal, i.e. coded by phase jumps.

The present invention particularly relates to decoding BPSK coded data sent by a contactless smart card, and the production of a contactless smart card read head that is simple in structure and inexpensive.

In accordance with draft standard ISO 14443, a contactless smart card operating by electromagnetic induction sends out data in the form of a BPSK coded signal. The coded signal is a subcarrier of a frequency of 847 KHz obtained by dividing the frequency of 13.56 MHz of the ambient magnetic field given off by a read head of the smart card. A bit is coded by a defined number of subcarrier cycles, and a change of the value of a bit, in relation to the previous bit, is coded by an inversion of the subcarrier phase. Upon receipt, the coded signal appears like a pulsed signal composed of pulses that have a duty factor of 0.5 and phase jumps. The detection of phase jumps allows the value of the bits sent by the smart card to be deduced.

In previous practices, a BPSK coded signal is usually decoded by means of a phase-locked loop PLL, the main component of which is a voltage-controlled oscillator VCO. However, a phase-locked loop is a rather costly complex circuit compared to the other components of a contactless smart card read head.

2. Discussion of the Related Art

An example of a phase-locked demodulation circuit is represented in FIG. 4 of application DE 34,24,623 or its equivalent, U.S. Pat. No. 4,608,540, and the circuit represented comprises a phase-locked loop comprising an oscillator VCO [10] and a loop filter [13].

Another classical technique for decoding a BPSK coded signal includes sampling and processing the signal by means of a digital algorithm. However, the sampling and processing of a signal at 847 KHz require a high sampling frequency and a fast microprocessor that also has the disadvantage of being rather costly.

Various sampling demodulation circuits are also described in application DE 34,24,623 or its equivalent, U.S. Pat. No. 4,608,540 (aforementioned), particularly in relation with FIGS. 5, 7 and 11 of these documents.

Finally, U.S. Pat. No. 5,640,427 describes, in relation with its FIG. 1, a coherent demodulator of MDPSK or 2PSK coded signals comprising an oscillator [16] delivering two signals LO_I and LO_Q phase shifted by 90°. The signals LO_I and LO_Q are logically combined with a signal to be demodulated IF, to produce two activation signals of two counters [32, 34] controlled by a counting clock the frequency of which is equal to N times the frequency F_IF of the signal IF to be demodulated. The outputs of the counters are processed by a computer [36] provided to implement various mathematical relations described in this document.

OBJECTS AND SUMMARY OF THE INVENTION

The object of the present invention is to provide a BPSK decoding method that can be implemented by means of simple and inexpensive components, particularly to produce a small, low-cost, contactless smart card read head.

This object is achieved by providing a method for decoding a pulsed signal coded by phase jumps, in which a bit is coded by N pulses of the coded signal and a change of the value of a bit in relation to the previous bit is coded by an inversion of the coded signal phase, a method comprising steps of: sampling the coded pulsed signal by means of a pulsed strobe of the same frequency as the coded signal, with a sampling window the duration of which is less than the duration of one pulse of the coded signal, and for each group of N pulses of the coded signal, counting the number of sampled pulses resulting from the sampling of the coded signal and assigning to the bit coded by the group of N pulses a logic value which is a function of the number of sampled pulses counted.

According to one embodiment, a first logic value is assigned to a bit when the number of sampled pulses is higher than or equal to a predefined number, and a second logic value is assigned to a bit when the number of sampled pulses is lower than the aforementioned predefined number.

According to one embodiment, the predefined number is equal to half the number N of bit coding pulses.

According to one embodiment, the coded signal is sampled by combining the coded signal and the strobe by means of the logic function AND, the strobe being composed of pulses of a shorter duration than the pulses of the coded signal, each defining a sampling window.

According to one embodiment, the method comprises a strobe synchronisation step aiming at setting the pulses of the strobe to the pulses of a start bit.

Preferably, the synchronisation step is carried out during the receipt of at least one synchronisation bit preceding the start bit, the value of which is the opposite of that of the start bit, and includes adjusting the strobe phase so that no sampled pulse appears.

The present invention also relates to a device for decoding a pulsed signal coded by phase jumps, the coding including coding a bit by N pulses of the coded signal and coding a change of the value of a bit in relation to the previous bit by an inversion of the coded signal phase, device comprising decoding means arranged to sample the coded pulsed signal by means of a pulsed strobe of the same frequency as the coded signal, with a sampling window the duration of which is less than the duration of a coded signal pulse, delivering a sampled signal, and for each group of N pulses of the coded signal, counting the number of sampled pulses resulting from the sampling of the coded signal and assigning a logic value to the bit coded by the group of N pulses which is a function of the number of sampled pulses counted.

According to one embodiment, the decoding means are arranged to assign a first logic value to a bit when the number of sampled pulses is higher than or equal to a predefined number, and to assign a second logic value to a bit when the number of sampled pulses is lower than the aforementioned predefined number.

According to one embodiment, the predefined number used by the decoding means is equal to half the number N of bit coding pulses.

According to one embodiment, the decoding means are arranged to sample the coded signal by combining the coded signal and the strobe by means of the logic function AND, the strobe being composed of pulses of a shorter duration than the pulses of the coded signal, each defining a sampling window.

According to one embodiment, the decoding means are arranged to carry out a strobe synchronisation step aiming at setting the pulses of the strobe to the pulses of a start bit.

According to one embodiment, the decoding means are arranged to carry out the synchronisation step during the receipt of at least one synchronisation bit preceding the start bit, the value of which is the opposite of that of the start bit, by adjusting the strobe phase so that no sampled pulse appears.

According to one embodiment, the device comprises a pulse width modulator to deliver the strobe, a sampler receiving the coded signal and the strobe at input, delivering a sampled signal, a counter receiving the sampled signal at its counting input, to count the number of sampled pulses resulting from the sampling of the coded signal, and a means for reading the output of the counter and for assigning a logic value to a bit coded by a group of N pulses which is a function of the number of sampled pulses counted by the counter.

According to one embodiment, the device comprises means for receiving the coded pulsed signal by inductive coupling.

The present invention also relates to a contactless smart card reader, comprising a device according to the present invention.

BRIEF DESCRIPTION OF THE DRAWINGS

These and other features and advantages of the present invention shall be presented in greater detail in the following description of the method of the present invention and of an example of an embodiment of the method in a contactless smart card read head, in relation with the following figures:

FIGS. 1A, 1B, 1C are timing diagrams of electric signals showing the method of the present invention, FIGS. 2A, 2B, 2C represent, in greater detail, one part of the timing diagrams in FIGS. 1A, 1B, 1C and show a synchronisation step.

DESCRIPTION OF THE PREFERRED EMBODIMENTS

Figure 3:
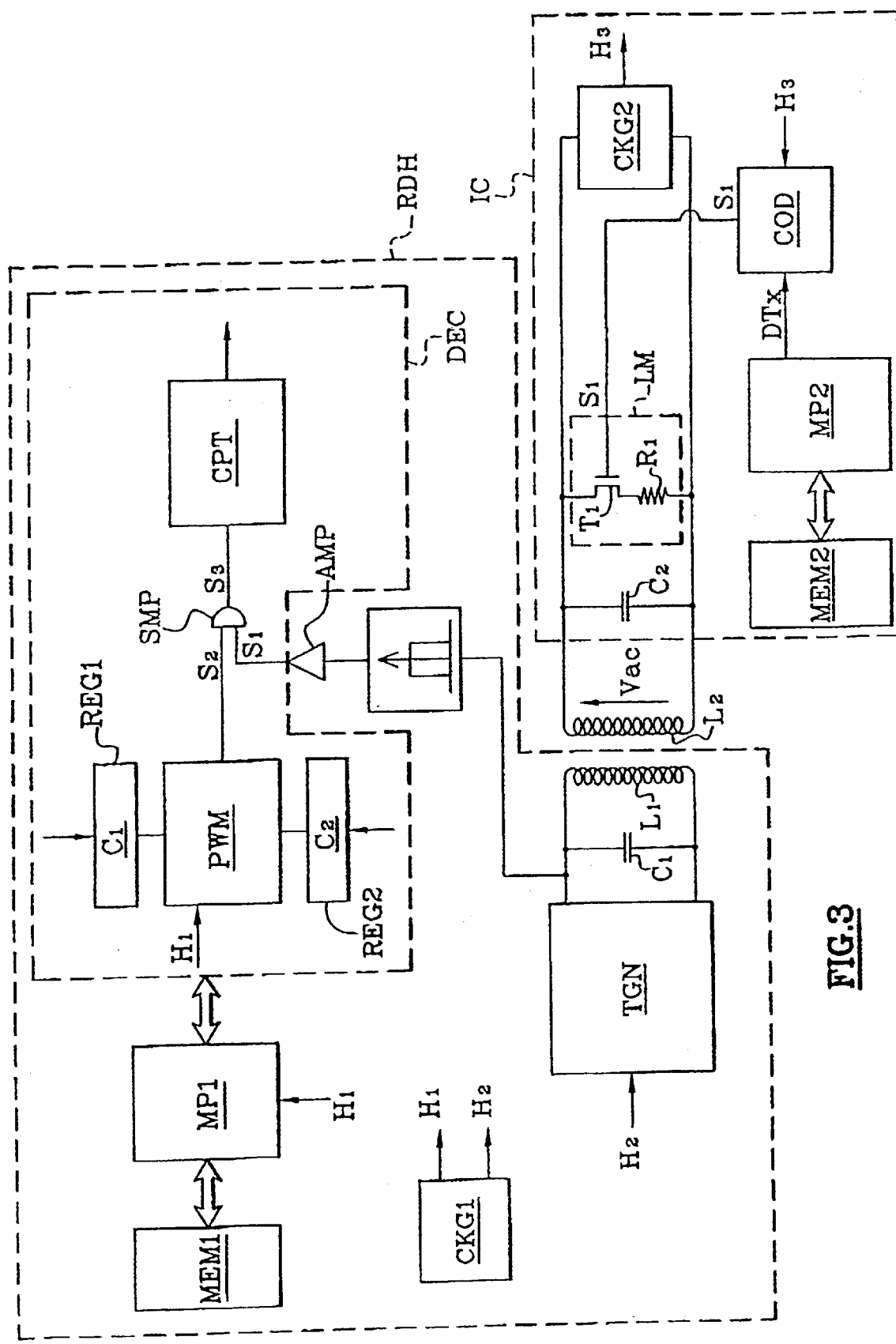
FIG. 3 represents, in block form, the wiring diagram of a contactless smart card read head and the wiring diagram of a contactless smart card integrated circuit.

FIG. 1A represents a pulsed signal S1 coded by phase jumps, comprising, in a classical manner, pulses $p_i$ that have a duty factor of 0.5. For example, the signal S1 is a coded signal sent by a contactless smart card and received by a card reader. The signal S1 is the result of the BPSK coding of a sequence of bits, each bit being coded by a defined number of pulses $p_i$, here eight pulses $p_1$ to $p_8$. The signal S1 comprises synchronisation bits $Bsy_i$, here two bits $Bsy_1$, $Bsy_2$, a start bit Bst, and data bits $B_1$ forming a sequence of bits $B_0, B_1, B_2, B_3 \ldots$ to be decoded. FIG. 1A shows the first pulses $p_i$ of the synchronisation bits $Bsy_1$, $Bsy_2$, the 8 pulses of the start bit Bst and of the first data bit $B_0$, along with the first pulses $p_i$ of the bit $B_1$. A change of the value of a bit in relation to the previous bit is coded by an inversion of the phase of the signal S1, translated by a phase jump of the signal S1 at the instant at which the new bit is sent.

Conventionally, the synchronisation bits $Bsy_i$ are on "1" while the start bit Bst is on "0", such that the BPSK coded signal S1 has a phase jump PS1 between the pulse $p_8$ of the second synchronisation bit $Bsy_2$ and the pulse $p_1$ of the start bit Bst. On FIG. 1A, the signal S1 also has a phase jump PS2 between the pulse $p_8$ of the first data bit $B_0$ and the pulse $p_1$ of the first second data bit $B_1$ which means that the value of the bit $B_0$ is the opposite of that of the bit Bst, i.e. here the value "1".

According to the present invention, the signal S1 is sampled by means of a strobe S2 of the same frequency as the signal S1, shown on FIG. 2B. This signal comprises pulses $s_1, s_2, s_3 \ldots$ the duration of which is less than that of pulses $p_i$, such as a quarter of the duration of pulses $p_i$ for example, defining sampling windows. The signals S1 and S2 are combined by means of the logic function AND, to produce a sampled signal S3 shown in FIG. 2C. The signal S3 is constituted by sampled pulses $q_i$, which appear when the pulses $s_i$ are set to the pulses $p_i$.

The method according to the present invention comprises a step of synchronising the signal S2 with the start bit Bst, which is carried out while the synchronisation bits $Bsy_i$ are being received. This step includes adjusting the phase of the signal S1 for the pulses $s_i$ to be set to the pulses $p_i$ of the start bit Bst, so that the receipt of the start bit Bst causes the appearance of sampled pulses $q_i$. The timing diagrams in FIGS. 2A, 2B, 2C show the synchronisation step in greater detail. In this example, it is assumed that the first pulse $s_1$, of the signal S2 is set to the first pulse $p_1$ of the synchronisation bit $Bsy_1$ and that one sampled pulse $q_1$ appears. Therefore, in the next period, the following pulse $s_2$ is shifted by an eighth of the period T. If a sampled pulse $q_2$ appears again, as is the case in FIG. 2C, the following pulse $s_3$ is shifted again by an eighth of the period and so on and so forth until the sampled pulses $q_i$ no longer appear. The strobe S2 is then synchronised with the signal S1.

With reference once again to FIGS. 1A to 1C, it can be seen that the effect of receiving the start bit Bst is to cause the sampled pulses $q_i$ to appear again, due to the phase jump PS1. The value of each next bit $B_0, B_1, B_2$ in relation to the previous bit is defined by counting the number of sampled pulses $q_i$ appearing during the 8 pulses $p_i$ constituting the bit. For example, the fact that 8 sampled pulses $q_1$ to $q_8$ ($\Sigma q_i = 8$) appear during the duration of the bit $B_0$ confirms that the bit $B_0$ has the same value as the bit Bst, i.e. the value "0". Similarly, the fact that no sampled pulse ($\Sigma q_i = 0$) appears during the duration of the bit $B_1$ leads to the deduction that the phase of the signal S1 has changed and that the bit $B_1$ has a value that is opposite that of the bit $B_0$, i.e. the value "1".

Therefore, the method according to the present invention allows the phase jumps of the signal S1 to be detected by means of a strobe S2 of the same frequency as the signal S1, by simply counting sampled pulses. There is no need to provide a high sampling frequency and rapid calculation means, as is the case in previous practices. Furthermore, the use of a strobe S2 constituted by pulses $s_i$ the duration of which is less than that of pulses $p_i$ is an optional, but advantageous feature of the method of the present invention allowing the sampled signal S3 to be generated by combining the signals S1 and S2 by means of a simple AND gate. There is no need to use a sample-hold circuit, that is complex in structure and costly, that would be triggered by the rising or falling edges of the signal S2. In practice, the logic function AND of the sampler SMP can easily be achieved by means of a FET-type transistor or equivalent controlled by the strobe S2, the source of which is connected to the ground and the drain of which is connected to the input of the counter CMPT and to the output of the amplifier AMP.

FIG. 3 represents the wiring diagram of a contactless smart card read head RDH implementing the method of the present invention. The read head RDH comprises a microprocessor MP1, a memory MEM1 to store a programme and data, a resonant antenna circuit comprising a coil L1 and a capacitor C1 in parallel, a circuit TGN to drive the antenna circuit L1C1 and a clock generator CKG1 delivering clock signals H1 and H2. The clock signal H1 is applied to the microprocessor MP1 and the signal H2 applied to the driver circuit TGN. The frequency of the signal H2 is 13.56 MHz in accordance with draft standard ISO 14443. The frequency of the signal H1 is equal to that of the signal H2 or is a multiple thereof.

The read head RDH also comprises a decoder DEC according to the present invention, comprising a sampler SMP, a pulse width modulator PWM and a counter CPT. Here, the sampler SMP takes the form of an AND gate the output of which is applied to the input of the counter CPT. The AND gate receives the output of the modulator PWM at input and the output of an amplifier AMP connected to the antenna circuit L1C1 by means of a band-pass filter FLT set to the 847 KHz. The modulator PWM is controlled by the clock signal H1 and comprises a register REG1 receiving a set point C1 defining the duty factor of the pulses it delivers, along with a register REG2 receiving a set point C2 defining the cycle time of these pulses.

Although it is not shown on FIG. 3 out of concern to remain simple, the outputs of the modulator PWM, of the amplifier AMP and of the counter CPT are accessible to the microprocessor. The microprocessor MP1 is a commercial microprocessor for example in which the modulator PWM and the counter CPT are integrated components, such as the PIC16C6X microprocessor marketed by Microchip Technology™.

Concerning the read head RDH, FIG. 3 also represents the diagram of an integrated circuit IC of a contactless smart card. The circuit IC comprises a microprocessor MP2, a memory MEM2 and an antenna circuit L2C2. The antenna circuit comprises an integrated capacitor C2 and an antenna coil L2 generally incorporated in the body of a plastic card (not shown). The circuit IC also comprises a charge modulation circuit LM, a clock generator CKG2 comprising frequency dividers and a BPSK-type coder COD the output of which controls the modulator circuit LM. The circuit LM and the generator CKG2 are both connected to the terminals of the antenna circuit L2C2. The modulator LM comprises, for example, a transistor T1 in series with a charge resistor R1. The generator CKG2 delivers a clock signal H3 applied to the coder COD.

When the antenna circuit L1C1 generates an alternative magnetic field FLD, of 13.56 MHz for example (standard ISO 14443), an induced voltage Vac of the same frequency appears in the antenna circuit L2C2. The frequency of the voltage Vac is divided by the clock generator CKG2 which delivers a clock signal H3 of 847 KHz (standard ISO 14443). The microprocessor MP2 delivers data DTx to coder COD to be transmitted, comprising two synchronisation bits $Bsy_i$ on "1" (or more, according to convention), a start bit Bst equal to "0" and data bits $B_0, B_1, B_2 \ldots$ The coder COD delivers a BPSK coded subcarrier of a frequency of 847 KHz, applied to the modulation transistor T1. This subcarrier constituted by pulses having a duty factor of 0.5 conforms to the signal S1 described above in relation to FIG. 1A. The subcarrier S1 is passed on by inductive coupling in the primary antenna circuit L1C1, and is extracted from the driver signal at 13.56 MHz by the filter FLT and is then located at the input of the sampler SMP (AND gate) after being amplified.

Figure 4:
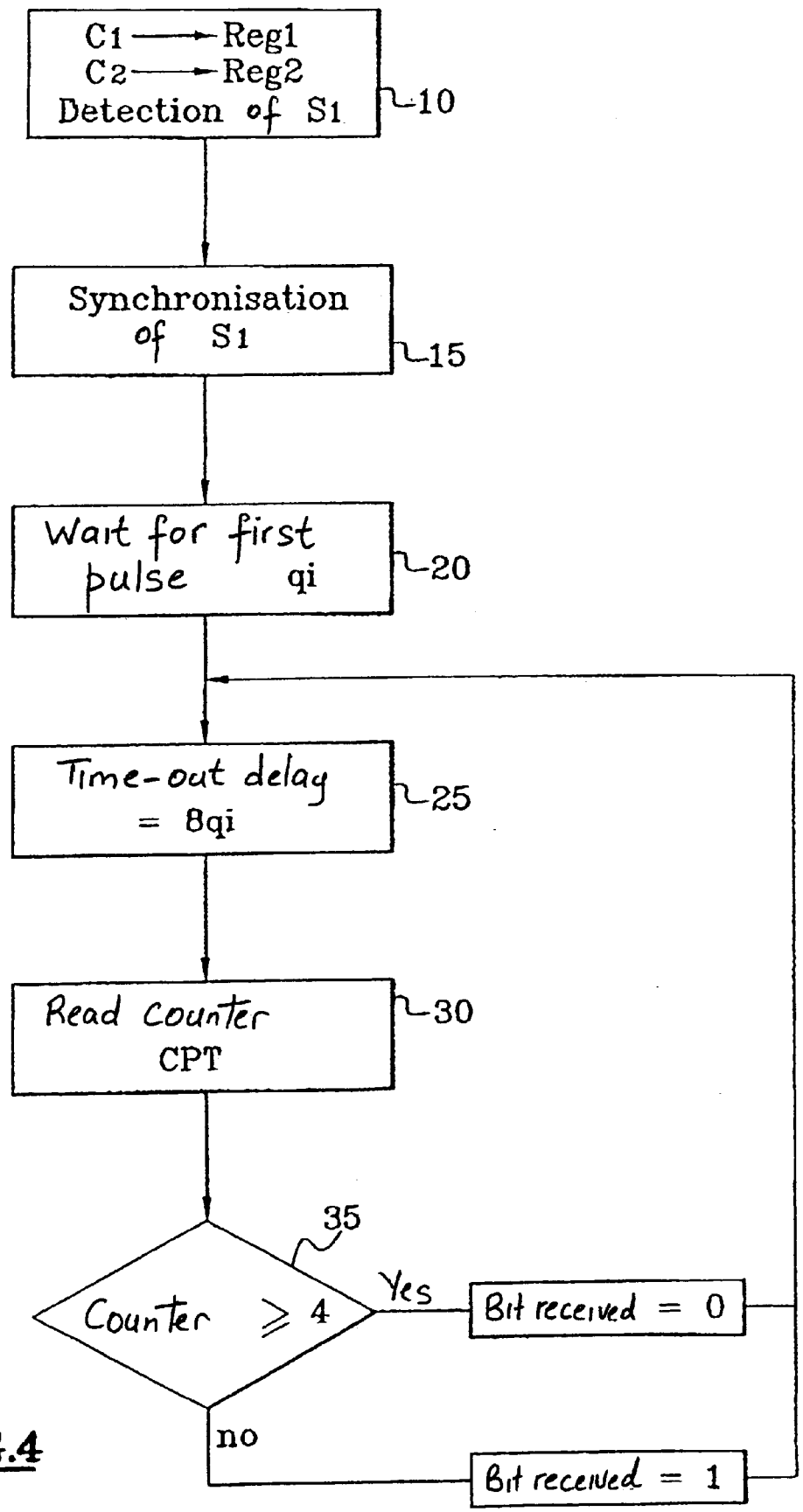
FIG. 4 represents the flowchart of a programme performing the method of the present invention.

To decode the subcarrier S1, the method of the present invention is implemented by the microprocessor MP1 under the control of a programme loaded into the memory MEM1. The main steps of this programme, shown in the flowchart in FIG. 4, are described below.

During step 10, the microprocessor MP1 monitors the output of the amplifier AMP and waits for the first pulse $q_i$ of the synchronisation bit $Bsy_1$. During this wait time, the microprocessor programmes the modulator PWM by loading into the registers REG1 and REG2 set points C1 and C2 chosen so that the modulator PWM delivers a signal S2 of the type shown in FIG. 2B, having the same frequency as the subcarrier S1, i.e. here 847 KHz, and constituted by pulses $s_i$ of a duration at least equal to or less than a quarter of the cycle time of the subcarrier S1.

Step 15 starts when the first pulse $q_i$ of the synchronisation bit $Bsy_1$ is received. The microprocessor adjusts the phase of the signal S2 in the way described above in relation to FIGS. 2A to 2C. For this purpose, the microprocessor observes the output of the sampler SMP. As the initial phase difference between the signals S1 and S2 is random, pulses $q_i$ may or may not appear. If pulses $q_i$ do appear, the microprocessor shifts the phase of the signal S2 step-by-step until the sampled pulses $q_i$ disappear (FIG. 2C). The progressive shifting of the phase of the signal S2 is, for example, carried out by inhibiting the generator PWM for a certain number of clock cycles H1. If no pulse $q_i$ appears, the shifting of the phase of the signal S2 is not required, in principle. For security, a phase scanning cycle may be provided to choose the optimal phase of the signal S2. For example, on FIG. 2B, an additional shift may be applied to the signal S2 so that the pulse $s_5$ is correctly centred between the two pulses $p_5$ and $p_6$ of the signal S1.

When the synchronisation step is finished, the microprocessor resets the counter CPT to zero during step 20 and waits, while monitoring the output of the counter CPT, for the first sampled pulse $q_i$ and the next seven pulses of the start bit Bst to be delivered by the sampler SMP.

Step 20 is followed by a time-out delay step 25 the duration of which corresponds to 8 pulses $p_i$ of the signal S1, i.e. 8 clock cycles H2. As the clock signal H1 of the microprocessor is proportional or equal to the signal H2, such a time-out delay can easily be obtained by a sequence of instructions without operation of the NOP ("No Operation") type, each corresponding to a certain number of clock cycles H1.

During steps 30 and 35, the microprocessor reads, on the output of the counter CPT, the number of sampled pulses $q_i$ delivered by the sampler SMP and deduces the value of the bit received from it. As the start bit is conventionally equal to 0, the bit received is equal to 0 if eight pulses $q_i$ have been recorded or is equal to 1 if no pulse $q_i$ has been received. At the end of these steps, the microprocessor returns to the time-out step 25 to receive the next bit.

In practice, the microprocessor can make errors in counting the pulses $q_i$ which leads to a shift of the counting window. With reference to FIG. 1C, it can be seen, for example, that missing or losing one pulse $q_i$ shifts the counting window to the right, such that a bit on 0 may correspond to a count of 7 or 8 pulses $q_i$ depending on the value of the next bit. To take such a possibility into account, it is considered that a bit on 0 is received if the number of sampled pulses $q_i$ is higher than or equal to half the number N of pulses $p_i$ used to code a bit, i.e. here 4 pulses. On the other hand, it is considered that a bit on 1 is received when the number of pulses $q_i$ is less than 4. Tests conducted by the applicant show that such an approximation compensates for the synchronisation errors of the counting window in most cases. In certain cases, the shift of the counting window can lead to the loss of a bit. However, such an error is detected when the signature (CRC) of the binary frame sent by the circuit IC is checked. As various other transmission errors are likely to occur, particularly due to disturbances of the magnetic field, isolated errors due to the method of the present invention do not have any significant practical consequences.

Finally, the BPSK demodulation method according to the present invention constitutes an advantageous alternative to classical analogical methods requiring a phase-locked loop and to classical digital methods requiring high sampling frequencies and a signal-processing algorithm. The method of the present invention may be implemented with a low-cost microprocessor having a relatively slow clock signal of the order of 13.56 MHz. The method of the present invention may also be implemented by means of a programmable logic circuit or a specific processor of ASIC ("Application Specific Integrated Circuit") type.

It will be understood that the method of the present invention is not reserved for decoding data sent by a contactless smart card and relates, in general, to decoding BPSK coded data, regardless of the way in which the data are received.

What is claimed is:

1. A method for decoding a BPSK coded signal, in which one bit is coded by N pulses of the coded signal and a change of the value of a bit in relation to the previous bit is coded by an inversion of the coded signal phase, comprising the steps of:
   sampling the coded signal by means of a pulsed strobe of the same frequency as the coded signal, with a sampling window the duration of which is less than the duration of one pulse of the coded signal, and
   for each group of N pulses of the coded signal, counting the number of sampled pulses resulting from the sampling of the coded signal and assigning a logic value to the bit coded by the group of N pulses which is a function of the number of sampled pulses counted.

2. A method according to claim 1 in which:
   a first logic value is assigned to a bit when the number of sampled pulses is higher than or equal to a predefined number, and
   a second logic value is assigned to a bit when the number of sampled pulses is lower than the aforementioned predefined number.

3. A method according to claim 2, in which said predefined number is equal to half the number N of bit coding pulses.

4. A method according to claim 1, in which the coded signal is sampled by combining the coded signal and the pulsed strobe by means of a logic function AND, the pulsed strobe being composed of pulses of a shorter duration than the pulses of the coded signal, each defining a sampling window.

5. A method according to claim 1, further comprising a step for synchronising a strobe, whereby adjusting the phase of the pulsed strobe so as to set the pulses of the pulsed strobe to the pulses of a start bit.

6. A method according to claim 5, in which the synchronisation step is carried out during the receipt of at least one synchronisation bit preceding the start bit, the value of which is the opposite of that of the start bit, and comprises a manner of adjusting the phase of the pulsed strobe so that no sampled pulse appears.

7. A device for decoding a BPSK coded pulsed signal coded by phase jumps, the coding including coding a bit by N pulses of the coded signal and coding a change of the value of a bit in relation to the previous bit by an inversion of the coded signal phase, the device comprising decoding means that comprise:
   a pulse width modulator to deliver a pulsed strobe having the same frequency as the coded signal and defining sampling windows the duration of which is less than the duration of one pulse of the coded signal,
   a sample circuit driven by the pulsed strobe, to sample the coded pulsed signal and deliver a sampled signal,
   a counter for counting the number of sampled pulses of the sampled signal for each group of N pulses of the coded signal, and
   a circuit for reading the counter output and assigning a logic value to the bit coded by the group of N pulses which is a function of the number of sampled pulses counted.

8. A device according to claim 7, in which said circuit for reading the counter output and assigning a logic value is arranged to:
   assign a first logic value to a bit when the number of sampled pulses is higher than or equal to a predefined number, and
   to assign a second logic value to a bit when the number of sampled pulses is lower than said aforementioned predefined number.

9. A device according to claim 8, in which said predefined number is equal to half the number N of bit coding pulses.

10. A device according to claim 7, in which the sample circuit comprises an AND gate combining the coded signal and the pulsed strobe, the pulsed strobe being composed of pulses of a shorter duration than the pulses of the coded signal, each defining a sampling window.

11. A device according to claim 7, arranged to carry out a strobe synchronisation step comprising adjusting the phase of the pulsed strobe so as to set the pulses of the pulsed strobe to the pulses of a start bit.

12. A device according to claim 7, arranged to carry out a synchronisation step during the receipt of at least one synchronisation bit preceding a start bit, the value of which is the opposite of that of the start bit, by adjusting the phase of the pulsed strobe so that no sampled pulse appears.

13. A device according to claim 7, comprising an antenna coil for receiving the coded pulsed signal by inductive coupling.

14. A contactless smart card reader (RDH), comprising the device according to claim 7.

* * * * *